Dec. 20, 1960 H. SCHOEPE 2,965,273
MACHINE TOOL HAVING HYDRAULIC FEED MECHANISM
Filed Oct. 3, 1955 5 Sheets-Sheet 1

INVENTOR.
HARRY SCHOEPE
BY Hudson, Doughton,
Williams, David & Hoffmann
ATTORNEYS

Dec. 20, 1960 H. SCHOEPE 2,965,273
MACHINE TOOL HAVING HYDRAULIC FEED MECHANISM
Filed Oct. 3, 1955 5 Sheets-Sheet 2
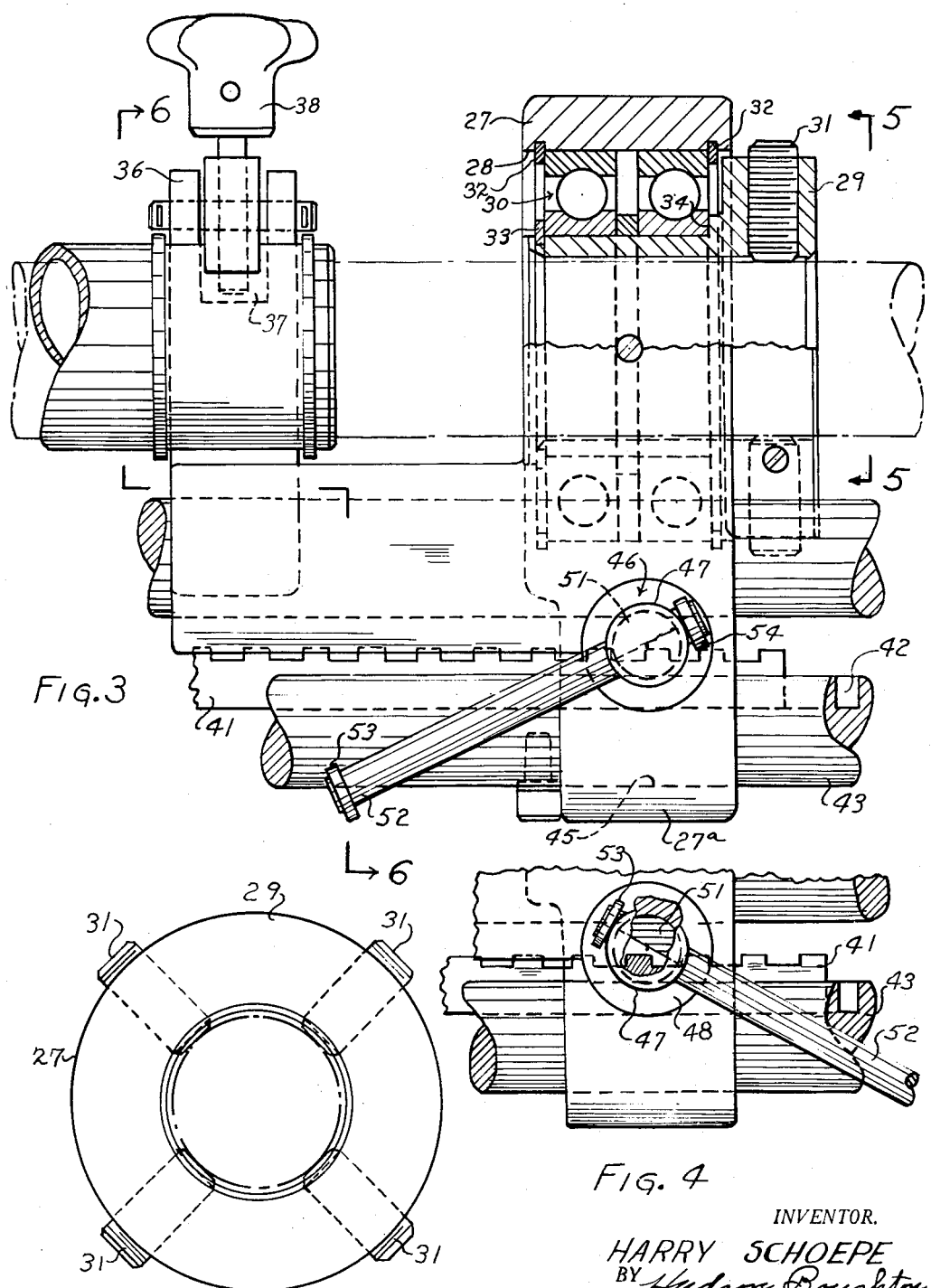
INVENTOR.
HARRY SCHOEPE
BY Hudson, Boughton,
Williams, Davis Hoffmann
ATTORNEYS Dec. 20, 1960  H. SCHOEPE  2,965,273
MACHINE TOOL HAVING HYDRAULIC FEED MECHANISM
Filed Oct. 3, 1955  5 Sheets-Sheet 3
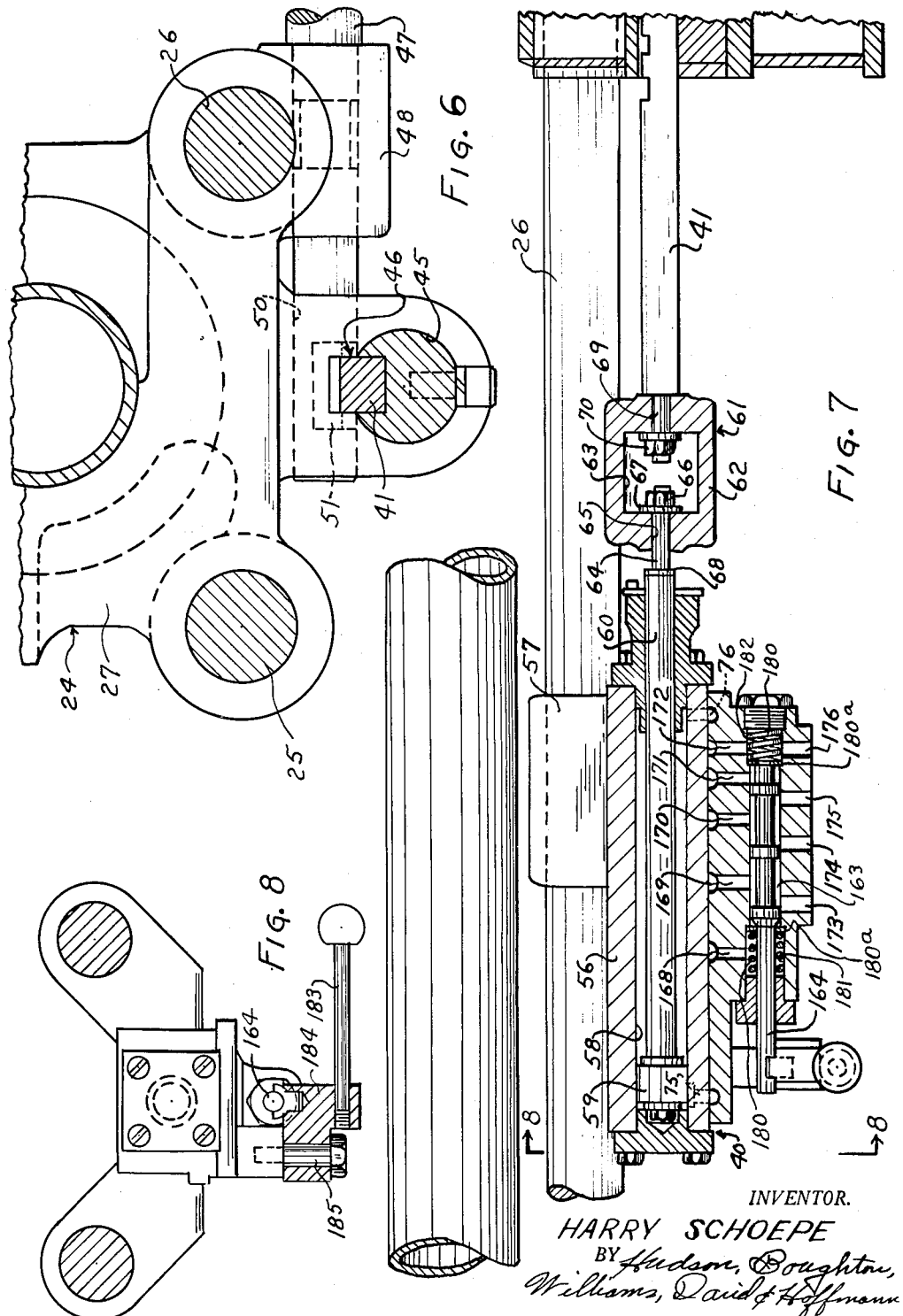
INVENTOR.
HARRY SCHOEPE
BY Hudson, Boughton,
Williams, David & Hoffmann
ATTORNEYS

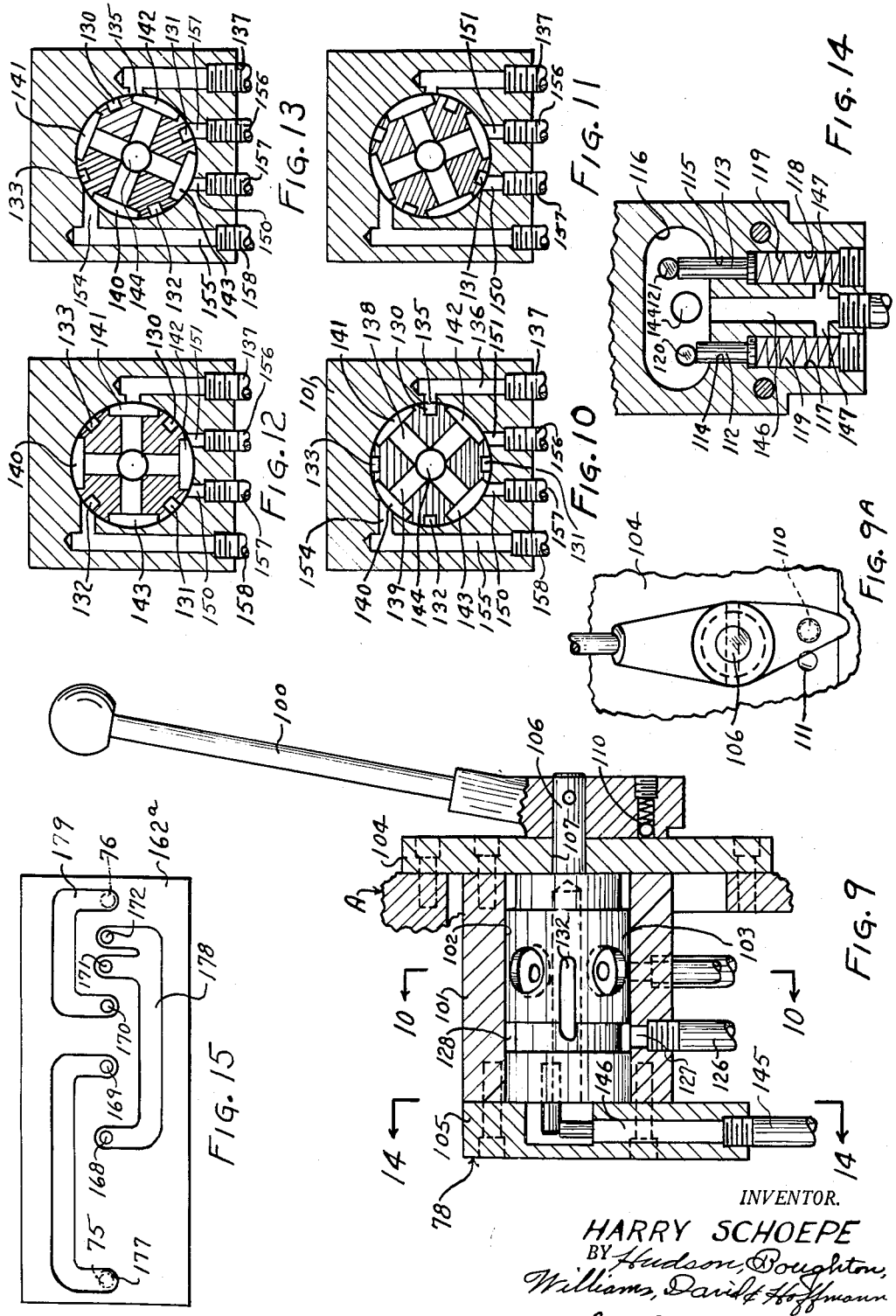

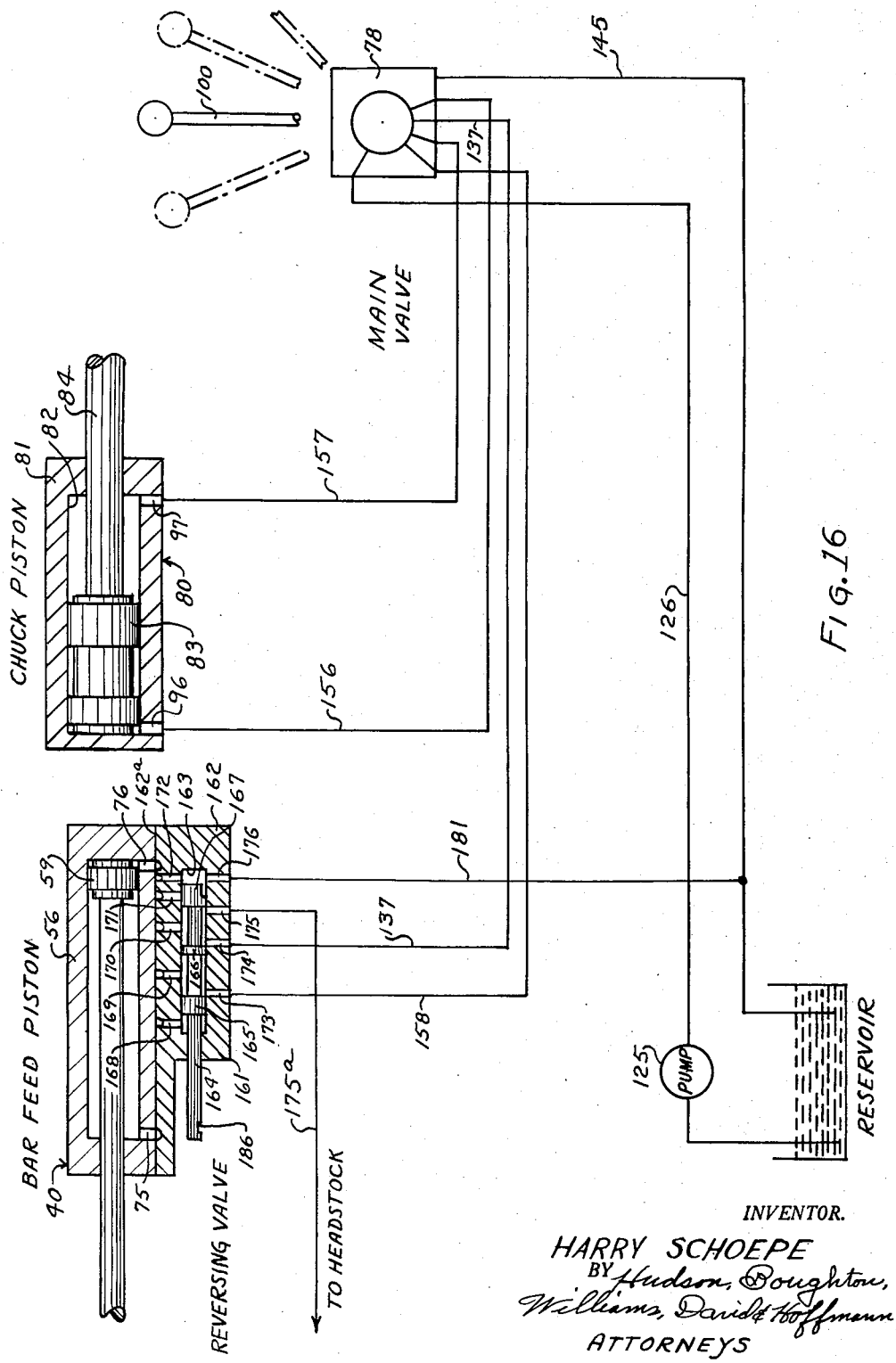

United States Patent Office 2,965,273
Patented Dec. 20, 1960

2,965,273

MACHINE TOOL HAVING HYDRAULIC FEED MECHANISM

Harry Schoepe, Cleveland, Ohio, assignor to The Warner-Swasey Company, Cleveland, Ohio, a corporation of Ohio Filed Oct. 3, 1955, Ser. No. 537,997

22 Claims. (Cl. 226—150)

The present invention relates to machine tools and, more particularly, to an automatic bar-working machine having power actuated mechanism for feeding bar stock through a hollow spindle of the machine.

In a bar-working machine, bar stock to be operated upon is chucked in, and rotated by, a hollow spindle with the bar stock extending both forwardly and rearwardly of the spindle. The machine mounts a tool, or tools, to perform a machining operation on the bar stock extending forwardly of the spindle, and when the machining operation is completed, the completed article is severed from the bar stock and the bar stock fed forwardly to move a new portion of the stock into position, to be operated upon by the tools, by bar stock feeding means engaging the portion of the bar stock extending rearwardly of the spindle.

An important object of the present invention is to provide a new and improved machine tool in which bar stock is fed through a hollow spindle by the operation of a fluid pressure motor and clamped for rotation with the spindle by a chuck actuated by a fluid pressure motor and in which a single control valve for the chuck and the bar feed motors has operative positions for respectively closing the chuck, opening the chuck and feeding the bar stock, whereby the chuck may be opened and closed independently of the operation of the bar feed fluid pressure actuated means, the control valve being so arranged that pressure fluid is supplied to chuck-operating means to open the chuck when the control valve is in its bar feed position.

Another object of the present invention is to provide a new and improved machine of the type referred to in which an oscillating or reciprocatory motor is oscillated or reciprocated through one or a plurality of strokes to feed the required length of a bar stock to the spindle of the machine and in which the motor is operable to return the bar-gripping member to a position to begin the feeding movement of a new portion of the bar, the bar-gripipng member in its feeding movement moving in only one direction and being maintained in a fixed position with respect to the bar stock.

Another object of the present invention is to provide a machine in which a bar-gripping member is moved in a feed direction by an oscillatory or reciprocatory motor which is operated through a plurality of reciprocations or oscillations to move the bar-gripping member throughout its range of movement, and in which the motor is connected to the bar-gripping member through a reversible ratchet mechanism which is reversible thereby enabling the motor to be used to feed and to return the bar-gripping member.

Another object of the present invention is to provide a new and improved bar-working machine wherein a bar-gripping member is provided to feed the bar stock through the spindle of the machine and is moved in a step-by-step manner to successively advance the bar stock upon the completion of a machining operation by a fluid pressure motor operatively connected to the bar-gripping member through a unidirectional motion-transmitting mechanism to enable the bar-gripping member to be moved in a feed direction only, even though the fluid pressure motor is reciprocated, and wherein the bar stock is chucked in the spindle by a hydraulically actuated chuck, the fluid pressure motor and the hydraulically actuated chuck being controlled by a single control valve operable to open and close the hydraulic chuck and to feed the bar-gripping member and bar stock forwardly with respect to the spindle, a reversing valve being provided in the fluid connections between the first-mentioned valve and the motor to enable the fluid pressure motor to be operated without actuating the first-mentioned valve to return the bar-gripping chuck after it has completed the feeding of a length of bar stock.

Another object of the present invention is to provide a new and improved machine tool in which a work-feeding member is movable in steps through a predetermined range of movements to successively feed the work to be operated upon, and in which the work-feeding member is moved through its range of movements by a fluid pressure actuated motor of the reciprocatory or oscillating type connected to the work-feeding member by a unidirectional motion-transmitting mechanism which is so constructed and arranged that it may be set to transmit only the motion of the motor in one or the other of its directions, the fluid pressure motor being under the control of a valve means having a neutral position in which fluid pressure is continuously supplied to the fluid pressure motor and is movable from the neutral position to actuate the fluid pressure motor to move it through the stroke for advancing the work-feeding member and to a position for supplying pressure fluid to a bar-holding chuck mounted in the spindle, and the valve means being connected to the fluid pressure motor by fluid connections which include a valve whereby the motor may be reciprocated or oscillated when the first-mentioned valve means is in a neutral position.

Another object of the present invention is to provide a machine tool of the type referred to having a single control valve for controlling the fluid pressure motor for feeding the bar stock and the fluid pressure motor for the hydraulically actuated workholding chuck, the fluid connections between the control valve and the fluid pressure motor for feeding the bar stock preferably including a valve which is operable to cause reciprocation of the motor without moving the single control valve from a position wherein the hydraulically actuated chuck may be closed.

The present invention resides in certain constructions and combinations and arrangements of parts, and further objects and advantages thereof will be apparent from the following detailed description of the preferred embodiment of the present invention made with reference to the accompanying drawings forming a part of this specification and in which:

Fig. 3 is a fragmentary elevational view, with parts in section, of the bar-gripping member;

Fig. 4 is a fragmentary detailed view showing the ratchet mechanism illustrated in Fig. 3 in a reverse position;

Fig. 5 is an end view of the bar-gripping member shown in the direction indicated by the arrows 5—5 in Fig. 3;

Fig. 6 is a sectional view taken approximately along irregular line 6—6 of Fig. 3;

Fig. 7 is a sectional view with parts in elevation of the power actuated means for operating the bar-gripping member;

Fig. 8 is an end view of the mechanism of Fig. 7 looking approximately from line 8—8 with a portion of the control lever in section;

Fig. 9 is a sectional view through the main control valve for the hydraulically actuated chuck and the bar feed motor;

Fig. 9a is a fragmentary front elevational view of the main control valve;

Figs. 10, 11, 12 and 13 are sectional views of the valve of Fig. 9 taken approximately along line 10—10 and showing the control valve in different positions;

Fig. 14 is a fragmentary sectional view taken approximately along line 14—14 of Fig. 9;

Fig. 15 is a developed view showing the fluid passages for controlling the flow of fluid to the hydraulic cylinder of Fig. 7; and Fig. 16 is a schematic hydraulic diagram of the control circuit for the fluid pressure motors for operating the bar-gripping and feeding member and the bar-holding chuck.

Figure 1:
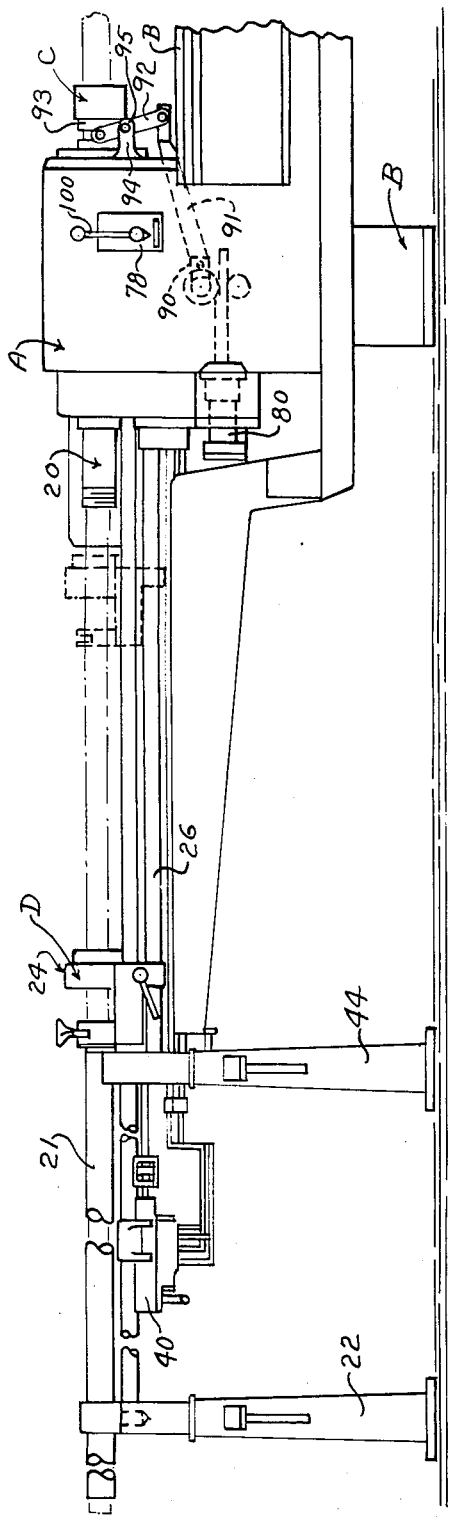
Fig. 1 is a fragmentary front elevational view of a bar-working machine embodying the present invention.

The present invention is particularly advantageous when embodied in a machine tool of the type for performing a machining operation on bar stock and has been embodied in such a machine for purposes of illustration.

Referring to the drawings, the machine tool illustrated therein comprises a headstock A mounted on a bed B. The headstock A includes a workholding spindle 20 adapted to be rotated by a conventional transmission in the headstock A. The spindle 20 is a hollow spindle and the work to be machined is in the form of bar stock which is supported in and extends both rearwardly and forwardly of the spindle. The bar stock is clamped against axial movement with respect to the spindle and for rotation with the spindle 20 by a workholding chuck C carried by the spindle. The chuck C is of conventional construction and is preferably a collet chuck which tends to remain in its immediate chuck-open or chuck-closed position until actuated therefrom.

The machine tool shown mounts suitable cutting tools, not shown, to machine the portion of the bar stock extending forwardly of the spindle, and the portion of bar stock extending rearwardly from the headstock A is supported in a tube 21 in axial alignment with the axis of the spindle 20 and slidably and pivotally supported in a rear stand 22. After the portion of the bar stock extending forwardly of the spindle has been machined and severed from the remainder of the bar stock, the bar stock is fed forwardly by bar stock feeding mechanism D to move a new portion of the bar stock in position to be machined. The bar stock feeding mechanism D includes a bar-gripping member 24 which engages the portion of the bar stock extending rearwardly of the spindle and which is movably supported by parallel horizontally extending rods 25, 26 fixed at their opposite ends to the stand 22 and the headstock A, respectively.

The bar-gripping member 24 comprises a body member 27 slidably supported on the rods 25, 26 and having a bored opening 28 therethrough in axial alignment with the spindle. A sleeve 29 is rotatably supported in the opening 28 by antifriction bearings 30. The sleeve 29 is formed with a collar at its forward end, and a plurality of circularly spaced gripping elements 31, four in the illustrated embodiment, for engaging the bar stock and securely gripping the same are threaded radially through the collar. In the illustrated embodiment, the antifriction bearings 30 are roller bearings held against axial movement with respect to the body member 27 by split rings 32 located at opposite sides of the bearings 30 in circumferential grooves in the bore 28. The bearings 30 are prevented from axial movement with respect to the sleeve 29 by a split ring 33 located in a groove in the circumference of the sleeve 29 at the rear end of the bearings 30 and by a shoulder 34 formed on the circumference of the sleeve 29 adjacent the forward side of the bearings 30.

The body member 27 for supporting the sleeve 29 and the gripping elements 31 of the bar-feeding mechanism also comprises a branch arm 36. The upper end of the branch arm 36 is provided with an opening to receive the guide sleeve or tube 21 and carries a clamp member 37 adapted to be actuated by a clamp screw 38. The clamp member 37 and the clamp screw 38 provide a means to fixedly connect the tube 21 and the body member 27. Hence, when the bar stock is fed forwardly through the collet chuck of the machine tool, the bar-supporting tube or sleeve 21 is carried therewith.

The bar-gripping member is moved along the support rods 25, 26 in successive steps to successively feed lengths of bar stock outwardly of the spindle 20 by power actuated means comprising a fluid pressure motor 40 supported by the rods 25, 26 immediately forward of the rear stand 22 and operatively connected to the body member 27 of the bar-gripping member through a rack 41. The rack 41 is slidably mounted in a groove 42 in the upper surface of a bar 43 supported between the headstock A and a front stand 44 positioned forwardly of the rear stand 22. The bar 43 and the rack 41 pass through a bore 45 in a lug 27a depending from the body member 27 of the bar-gripping member 24. The rack 41 and the body member 27 are interconnected by a ratchet mechanism 46 which transmits axial movement of the rack in one direction to the body member and permits free relative movement of the rack with respect to the body member when the rack is axially moved in the opposite direction.

The ratchet mechanism 46 comprises a pawl pin 47 supported in a boss 48 depending from the body member 27 forwardly of the lug and extending transversely of the bar 43. The pawl pin 47 passes through a bore 50 in the lug 27a, which bore intersects the bore 45 for passing the rack 41 and the bar 43. The pawl 47 is cut away to form pawl portion 51 intermediate its end immediately above the rack 41, which portion is of a width slightly greater than the rack. The cross section of the pawl pin 47 at the pawl portion 51 is semicircular with a radius the same as the radius of the remainder of the pawl pin. The straight line or flat section of the pawl portion of the pawl pin is adjacent to the teeth of the rack 41 and the pawl portion forms a double-acting or two-way ratchet pawl.

The forwardly extending portion of the pawl pin 47 is provided with a diametrical bore in which a counterweight bar 52 is slidably mounted. The counterweight bar 52 has collars 53, 54 fixed to its opposite ends to prevent the bar from sliding out of the bore in the pawl pin 47. The counterweight bar 52 is so mounted in the pawl pin 47 that when the bar 52 is horizontal, the straight line portion of the pawl 51 is also substantially horizontal and the pawl is out of engagement with the rack teeth on the rack 41. If, however, the counterweight bar 52 is rotated in a counterclockwise direction from its horizontal position, and the counterweight bar 52 moved downwardly until the collar 54 engages the pawl pin 47, the pawl 51 will be rotated and yieldably held in a position where the circular circumference of the pawl 51 will engage the right side of the teeth of the rack, as viewed in the drawing, and cause the pawl 51 and the body member 27 to move with the rack when the rack is moved forward or to the right. However, if the rack is moved to the left with the pawl in the described position, the teeth of the rack will engage the flat surface of pawl 51 and rock the pawl about its axis to permit free movement of the rack with respect to the body member 27, the counterweight bar yieldably maintaining the pawl in engagement with the rack. Similarly, if the counterweight bar 52 is rotated clockwise from its horizontal position, as shown in Fig. 4, and the collar 53 moved into engagement with the pawl pin 47, the pawl 51 will function to cause the body member 27 to move with the rack 41 when the latter is moved rearward or to the left, as viewed in Fig. 4, and will permit free movement of the rack bar with respect to the body member 27 when the rack bar is moved to the right.

As hereinbefore mentioned, the rack bar is connected to a fluid pressure motor 40 supported by the rods 25, 26. The fluid pressure motor 40 comprises a cylinder housing 56 supported on the rods 25, 26 by a bracket 57. The cylinder member 56 has a cylindrical bore or cylinder chamber 58 therein in which a piston 59 is slidably mounted. A piston rod 60 extends from the piston 59 through a closed end of the cylinder housing and has its outer end connected to the rack 41 by a lost motion connection 61. The lost motion connection 61 comprises a body member 62 having a square-shaped opening 63. The outer end portion 64 of the piston rod 60 is of reduced diameter and passes through an opening 65 in the body member 62 and extends into the opening 63. The outer end of the end portion 64 is threaded to receive a nut 66 to prevent the portion 64 of the rod 60 from being withdrawn from the opening 65 of the body member 62. A washer 67 is preferably positioned intermediate the nut 66 and the body member 62 of the connection 61. The reduced portion 64 forms a shoulder 68 which is spaced from the body member 62 when the washer 67 is against the side wall of the opening 63 in the body member 62, and when the piston is moved outwardly, lost motion will occur for the first part of its movement and then the shoulder 68 will strike the body member 62 with a hammer-like action and continued movement of the piston rod will be transmitted to the rack 41. The rack 41 has a reduced portion 69 on its left-hand end, as viewed in Fig. 7, which passes through the body member 62 into the opening 63. The body member 62 and the rack 41 are connected in fixed relationship by a nut 70 which threads onto the outer end of the reduced portion of the rack to securely clamp the body member between the nut and a shoulder formed by the reduced portion of the rack.

The cylinder housing 56 has radial ports 75, 76 communicating with the cylinder chamber at the opposite ends thereof, respectively. When pressure fluid is supplied to the port 75, and the port 76 connected to reservoir return or drain, the piston 59 is moved to the right, as viewed in Figs. 7 and 16. If pressure fluid is supplied to the port 76, and the port 75 connected to drain, the piston 59 will move to the left-hand end of the cylinder chamber, as viewed in Figs. 7 and 16. In the illustrated embodiment, the supply of pressure fluid to the fluid pressure motor 40 is normally controlled by a main control valve 78 supported on the headstock A and preferably having four operating positions.

The main control valve 78 also controls the operation of a fluid pressure motor 80 for actuating the workholding chuck C, carried by the spindle 20, between its open and closed positions. The fluid pressure motor 80 comprises a cylinder member 81 having a cylinder chamber 82 in which a piston 83 is slidably mounted. The piston 83 has a piston rod 84 connected thereto and extending outwardly therefrom through a closed end of the cylinder member 81. The outer end of the piston rod 84 has rack teeth 85 formed thereon which continuously mesh with a pinion gear 86 rotatably supported by the headstock A. The side of the piston rod 84 opposite to the rack teeth 85 engages a supporting roller 87 which is also rotatably supported by the headstock. The supporting roller 87 maintains the rack teeth in mesh with the pinion gear 86 during the movement of the piston rod 84.

The pinion gear 86 is fixed to a shaft 88 which carries a crank arm 90 to which one end of a link 91 is pivotally connected. The opposite end of the link 91 is pivotally connected to one end of a chuck-operating lever 92, the other end of the chuck-operating lever 92 being operatively connected to a movable chuck-actuating member 93 of the workholding chuck C. The chuck-operating lever 92 is pivotally supported intermediate its ends by a bracket 94 fixed to the headstock A and connected to the lever 92 by a pivot pin 95. The chuck-actuating member 93 is moved between its chuck-open position and its chuck-closed position by rotation of the chuck lever 92 about its pivot connection to the bracket 94.

Figure 2:
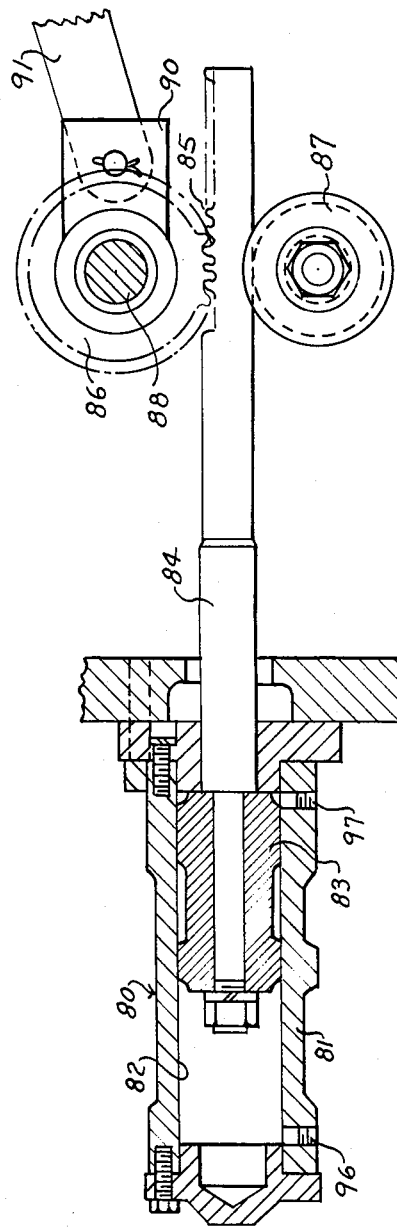
Fig. 2 is an enlarged view, with parts in section and parts in elevation, of the mechanism for operating the workholding chuck of the machine shown in Fig. 1.

The crank arm 90 and the link 91 constitute a toggle mechanism for moving the chuck-operating lever between its chuck-closed and chuck-open positions. When the piston 83 is at the right-hand end of the cylinder chamber 82, as viewed in Fig. 2, and the crank arm 90 and the link 91 in the positions shown in Fig. 2, the chuck is closed and the crank arm 90 and the link 91 are substantially in their dead-center positions. The workholding chuck will remain closed even through fluid pressure is removed from the left-hand side of the piston 83. When pressure is supplied to the fluid motor 80 to move the piston 83 to the left-hand end of the cylinder, as viewed in Fig. 2, the pinion gear 86 is rotated clockwise by the rack teeth 85 to rock the crank arm downwardly to move the chuck-operating lever 92 about its pivot pin 95 and move the chuck-actuating member 93 to its chuck-open position.

Pressure fluid is supplied to, or exhausted from, the cylinder chamber 82 of the fluid pressure motor 80 to cause movement of the piston 83 through either one of two ports 96, 97 extending through the cylinder member 81 into communication with the cylinder chamber. The ports 96, 97 are respectively located at opposite ends of the chamber.

The preferred form of the main control valve 78 for controlling the operation of the fluid pressure feed motor 40 and the fluid pressure motor 80 is illustrated in Figs. 9 through 14 of the drawings. The main control valve has an operating handle 100 which is movable to three operative positions from a neutral position for respectively closing the workholding chuck, opening the workholding chuck, and feeding the bar stock. The operating handle 100 of the main control valve is shown in its neutral position in Fig. 1 and is moved counterclockwise from the neutral position to its chuck-close position and clockwise from its neutral position to first its chuck-open position and then to its bar feed position.

Referring to Figs. 9 through 14, the main control valve 78 comprises a valve housing 101 having a bore 102 therein in which a rotatable valve member 103 is supported for rotation with respect to the valve housing. The valve housing 101 includes front and rear end plates 104, 105, respectively, which close the opposite ends of the bore 102. The front end plate 104 extends laterally of the main body portion of the valve housing 101 and the laterally extending portions are bolted to a wall of the headstock A to connect the main control valve to the headstock, as best shown in Fig. 9.

The rotatable valve member 103 has a reduced portion 106 extending axially from the right-hand end thereof, as viewed in Fig. 9, through a bore 107 in the end plate 104, the bore 107 functioning as a bearing for the rotatable valve member. The outer end of the reduced portion 106 mounts the operating handle 100 for rotating the valve member 103. The lower portion of the handle 100 carries a spring ball detent 110 adapted to cooperate with a recess 111 in the face of the end plate 104 to secure the operating handle 100 and the rotatable valve member 103 in its chuck-open position.

The operating handle 100 and the rotatable valve member 103 is urged to its neutral position when moved therefrom by spring means located in the rearward portion of the valve housing 101. The spring means for urging the operating handle 100 to its neutral position comprises a pair of spring-biased plungers 112, 113 slidably supported in bores 114, 115, respectively, in the rear end plate 105 on opposite sides of the axis of rotation of the rotatable valve member 103. The plungers 112, 113 extend upwardly from the bore 114, 115 into a recess 116 in the end plate 105, which recess opens into the bore 102 of the valve housing 101. The lower ends of the plungers 112, 113 extend into counterbores 117, 118, respectively, in which biasing springs 119 are located. The lower ends of the plungers 112, 113 have shoulders which abut the bottoms of the counterbores 117, 118, respectively, and which engage the respective springs 119.

The upper ends of the spring-biased plungers 112, 113 engage pins 120, 121, respectively, extending from the rearward end of the rotatable valve member 103 into the recess 116. It can be seen that when the operating handle 100 is rotated in either direction from its neutral position, one of the pins 120, 121 will depress its corresponding plunger to compress the corresponding spring 119 and apply a bias tending to return the operating handle 100 and the rotatable valve member 103 to their neutral position. It will be noted that the plunger 113 is longer than the plunger 112, and the pin 121 is located above the pin 120, as viewed in Fig. 14. This is to allow movement of the rotatable valve member and the operating handle 100 to two positions when moved in a clockwise direction, as viewed in Fig. 14, and to one position when moved in a counterclockwise direction, as viewed in Fig. 14.

In the illustrated embodiment, the operative positions of the valve member 103 and the handle 100 are spaced 22½° from the adjacent positions. It is often desirable to maintain the handle in its chuck-open position against the action of springs 119 and this may be accomplished by means of the ball detent 110 hereinbefore referred to. The ball detent 110 is preferably so constructed that if the operating handle 100 is moved to its extreme position in a clockwise direction, as viewed in Fig. 1, for feeding the bar stock, and released, the ball detent 110 will ride over the recess 111 and the operating handle returned to its neutral position by the springs 119. If, however, the operating handle 100 is moved to its chuck-open position, the first position from the neutral position of the handle in a clockwise direction, the ball detent 110 will engage the recess 111 and hold the operating handle and the valve member 103 against the action of springs 119.

Pressure fluid for operating the motors 40, 80 is supplied by a pump 125 supported by the frame of the machine. The pump 125 is shown diagrammatically in Fig. 16 and may be provided with a conventional pressure relief valve, not shown. A conduit 126 connects the discharge of the pump and the main control valve 78. The conduit 126 communicates with a port 127 in the valve housing 101 extending from a counterbore for receiving the conduit 126 to the internal circumference of the bore 102, see Fig. 9. The rotatable valve member has an annular circumferential groove 128 positioned directly opposite the port 127. The groove 128 communicates with four axially extending passages 130, 131, 132, 133 formed in the circumference of the rotatable valve member 103 and spaced approximately 90° from each other in the illustrated embodiment. In the neutral position of the valve, the passages 130 lie, in the illustrated embodiment, approximately along the horizontal and the vertical, as shown in Fig. 10. When the valve member 103 is in the neutral position shown in Fig. 10, the pressure passage 130 registers with a port 135 in the valve housing 101, which port communicates with a passage 136 in the valve housing connected to a conduit 137 for supplying pressure fluid to the fluid pressure motor 40 for feeding the bar stock. The other pressure passages 131, 132, 133 are blocked by the circumference of the bore 102.

In addition to the pressure passages 130–133, the valve member 103 has intersecting diametral passages 138, 139 formed in the plane of Fig. 10 through the valve member 103. The diametral passages 138, 139 are at right angles to each other and intersect the circumference of the valve member 103 at points midway between pairs of the pressure passages 130—133. The ends of the diametral passages 138, 139 open into counterbores to provide relatively large drain ports 140, 141, 142, 143 in the circumference of the valve which communicate with the diametral passages 138, 139. The port 140 is positioned intermediate the pressure passages 132, 133; the port 141 intermediate the pressure passages 133, 130; the port 142 intermediate the pressure passages 130, 131; and the port 143 intermediate the pressure passages 131, 132.

The diametral passages 138, 139 are connected to drain or reservoir return through an axial bore 144 in the valve member 103 extending from the rearward end thereof and intersecting the diametral passages 138, 139. The rearward end of the bore 144 registers with the recess 116 in the rear end plate 105 and the recess 116 is connected to a conduit 145 leading to the reservoir or sump through a vertically extending passage 146 in the end plate 105 positioned intermediate the spring-biased plungers 112, 113. The passage 146 is connected to the counterbores 117, 118 for the plungers 112, 113 by horizontally extending passages 147 to collect any leakage into the counterbores and return the leakage to the sump.

The valve housing 101 has a pair of ports 150, 151 in the lower portion thereof which communicate with the bore 102. The port 150 is in registry with the drain port 143 in the valve member 103 when the latter is in its neutral position and is so located that it will remain in registry with the part 143 when the valve body 103 is rotated 22½° in a counterclockwise direction from its neutral position and will register with the pressure passage 131 when the valve member 103 is rotated 22½° in a clockwise direction from its neutral position, and with the drain port 142 when rotated 45° in a clockwise direction.

The port 151 in the valve housing 101 is so positioned that it is in registry with the drain port 142 in the valve member 103 when the latter is in its neutral position and remains in registry therewith as the valve member is rotated 45° in a clockwise direction from its neutral position and is placed in registry with the pressure passage 131 when the valve member 103 is rotated 22½° in a counterclockwise direction from its neutral position. The valve housing 101 is formed with a fourth port 154 which communicates with the interior of bore 102 and is in such a position that it registers approximately with the center of the drain port 140 in the valve member 103 so that it will remain in registry with the drain port 140 when the valve member 103 is rotated 22½° in either direction from its neutral position and will be placed in registry with the pressure passage 132 when the valve body 103 is rotated 45° in a clockwise direction from its neutral position. The port 154 communicates with a vertically extending passage 155 in the valve housing 101.

The ports 150, 151 are, respectively, connected to the ports 96, 97 in the cylinder member 81 of the chuck-actuating motor 80 by conduits 156, 157 while the ports 154, 135 provide connections to the fluid pressure motor 40 for feeding the bar stock and are connected, respectively, to conduits 137, 158. It can now be seen that when the operating handle 100 is in its neutral position, shown in Fig. 10, the conduits 156, 157 to the chuck-operating motor 40 are connected to drain since the ports 150, 151 register, respectively, with the drain ports 142, 143 in the valve member 103 and that the conduit 158 to the fluid pressure motor 80 is connected to drain since the port 154 in the valve housing 101 registers with the drain port 140 in the valve body 103, and the conduit 137 leading to the fluid pressure motor 80 is under pressure since the port 135 is in registry with the pressure passage 130.

Normally, the conduit 158 from the main control valve 78 to the fluid pressure motor 80 is in communication with the port 75 in the cylinder member 56 through a reversing valve 161 carried by the cylinder member 56. The side 162a of a valve housing 162 of the reversing valve 161 adjacent the cylinder member 56 is shaped so as to conform closely to the configuration of the outside of the cylinder and is formed with grooves providing a plurality of pressure passages which will be described in detail. The valve housing 162 is provided with a bore 163 extending parallel to the axis of the cylinder member 56 and has a slidable valve member 164 therein. The slidable valve member 164 has spaced lands 165, 166, 167 thereon which control the flow of fluid between axially spaced ports 168, 169, 170, 171, 172 extending from the bore 163 to the side 162a of the valve housing 162, and axially spaced ports 173, 174, 175, 176 extending between the bore 163 and the lower side of the valve housing 162. The conduits 158, 137 are connected to the ports 173, 174 in the lower side of the valve housing 162.

The land 165 on the slidable valve member 163 is normally positioned between the upper port 168 and the lower port 173 so that the port 168 is not placed in communication through the axial bore 163 with the lower ports of the valve housing and so that the lower port 173 is normally in communication through the bore 163 with the upper port 169. The port 169 is in communication with the port 75 in the cylinder member 56 through a groove 177 in the side 162a of the valve housing 162. The land 166 is normally positioned intermediate the upper port 169 and the lower port 174 so that the lower port 173 is only in communication with the upper port 169. The lands 166, 167 of the slidable valve member 163 are so spaced that the lower port 174 is normally in communication through the bore 163 with the lower port 175 and with the upper port 170, the upper port 170, in turn, being in communication with the port 76 in the right-hand end of the cylinder member 56 through a groove 179 in the side 162a. The land 167 is positioned intermediate the lower port 175 and upper port 171, and the upper port 171 is in communication with the ports 168, 172 through a groove 178 in the valve housing. The upper port 172 and, in turn, the ports 171, 172 are normally connected to drain through the bore 163 and the lower port 176, the lower port 176 being connected to the reservoir by a conduit 181. The ports 168 and 176 will catch any fluid leakage along the valve member 164 and return the same to the reservoir through the conduit 181. It will be noted that the port 168 is normally connected to the port 172 by the groove 178, the port 172, in turn, being in communication with the port 176 and conduit 181 through the bore 163.

The slidable valve member 164 is normally biased to the above-described position by two springs 180 positioned, respectively, in counterbores 181, 182 at the opposite ends, respectively, of the bore 163. The springs 180 abut washers 180a about the slidable valve member 164 to urge the slidable valve member to the position shown, the washers 180a abutting against shoulders on the slidable valve member 164. The springs 180 will function to return the slidable valve member 164 to the position shown in Fig. 7 whenever the valve member is moved therefrom.

As hereinbefore stated, the conduit 158 is normally in communication with the port 75 in the cylinder member 56 and that the conduit 137 is normally in communication with the port 76 in the cylinder 56. When the main control valve 78 is in its neutral position, pressure fluid is supplied from the pump 125 through the control valve 78 to the conduit 137 in the manner described above. Since the conduit 137 is in communication with the port 76 in the cylinder member 56, in the manner described above, the right-hand side of piston 59 is subjected to pressure which causes it to move to the left-hand end of the cylinder member 56, as viewed in Fig. 7. It will be noted that the port 75, in communication with the cylinder chamber on the left-hand side of piston 59, is connected to reservoir return through the reversing valve 161, conduit 158 and the control valve 78. As pointed out above, all connections to the main control valve, with the exception of the pressure conduit 126 and the conduct 137, are connected to drain by the valve member 103 when the valve is in its neutral position.

When the valve-operating handle 100 is moved clockwise 22½° to its chuck-open position, the conduits 137, 158 to the reversing valve 161 are connected to drain by the valve member 103, as shown in Fig. 11, as well as the conduit 156 leading to the left-hand side of the piston 83 in the chuck-operating motor 80. The conduit 157, however, is connected to the discharge of pump 125 through the port 150 which is now in registry with the pressure passage 131, as shown in Fig. 11.

When the operating handle 100 for the main control valve 78 is moved clockwise an additional 22½° from its chuck-open position to its bar feed position, the valve body 103 is rotated to the position shown in Fig. 12 where the ports 150, 151 are connected to drain by the drain port 142 thereby connecting both sides of the piston 83 of the chuck-operating motor 83 to drain. With the operating handle 100 for the main control valve 78, in its bar feed position shown in Fig. 12, the conduit 137 leading to the reversing valve 161 and the fluid pressure feed motor 40 is connected to drain through the port 135 in the valve housing 101 and the drain port 141 in the valve member 103. The conduit 158 leading to the reversing valve 161 and the fluid pressure feed motor 40 is connected to the discharge of the pump through the port 154 in the housing 101 and the pressure passage 132 now registering with the port 154.

It can now be seen that when the operating handle 100 of the control valve 78 is in its bar feed position, the conduit 137 is connected to drain and the conduit 158 to the source of pressure fluid, and that pressure fluid is supplied to the left-hand side of piston 59 through the port 173 of the reversing valve 161, the bore 163, the port 169, the groove 177, and the port 75 in the cylinder housing 56. The other side of the piston 59 is connected to drain through the port 76 in the cylinder member 56, the groove 179, the port 170, the bore 163 and the port 174 in the reversing valve 161 which is, in turn, connected to the conduit 137, the latter being connected to drain in the manner above described. This causes the piston 59 to move to the right and advance the bar-gripping member 24 to move the bar stock in a feed direction. When the operating handle 100 is released, it will move to its neutral position and the piston 59 will be returned to the left-hand end of the cylinder housing 56 in the manner described above.

The lower port 175 of the reversing valve 161 is connected by conduit 175a to fluid pressure operated clutches in the headstock, which clutches are operable to engage and disengage the drive for the spindle. It will be noted that the port 175 is connected to the conduit 137 when the reversing valve is in the position shown in Figs. 7 and 16 and is connected to the conduit 158 when the slidable valve member 164 is moved to the right to block communication between the lower ports 174, 175 and to place the upper port 171 in communication with the lower port 175. It will be remembered that when the slidable valve member 164 is shifted to the right, the upper port 171 is connected to the conduit 158 through the groove 179, the port 168, the bore 163, and the port 171.

Since the conduit 137 only has fluid pressure supplied thereto only when the operating handle 100 of the main control valve 78 is in its neutral position and the conduit 158 is always connected to drain when the reversing valve is shifted to the right, pressure fluid will not be supplied to the headstock through the port 175 and the conduit 175a if the main control valve 100 is moved to a position to perform any one of the operations under its control or if the reversing valve is shifted to the right during the return operation of the bar-gripping member. Therefore, the spindle will rotate only when the operating handle 100 is in its neutral position and the reversing valve is in the position shown.

To close the workholding chuck C carried by the spindle 20, the operating handle 100 is moved counterclockwise from its neutral position to its chuck-close position to supply pressure fluid to the conduit 156 and connect the conduit 157 to drain. Referring to Fig. 13, it will be seen that in the chuck-close position the conduit 156 is connected to the source of pressure fluid through the port 151 in the valve housing 101 which now registers with the fluid pressure passage 131, and that the conduit 157 is connected to drain through port 150 which now registers with the drain port 143 of the valve member 103. With the conduit 156 under pressure and the conduit 157 connected to drain, the piston 83 moves to the right-hand end of the cylinder chamber as the latter is viewed in Fig. 16 to close the chuck C. In addition, the conduits 137, 158 leading to the feed motor 40 are connected to drain by the drain ports 142, 140, respectively, through ports 135, 154, respectively, to relieve the motor 40 of all fluid pressure.

It will be noted that when the operating handle 100 of the main control valve is returned to its neutral position, the conduits 156, 157 leading to the chuck-operating motor 80 are connected to drain in the manner described above, and the fluid pressure motor 80, therefore, has both sides of the piston 83 connected to drain to relieve any fluid pressure in the motor. The workholding chuck, however, will remain in its closed position due to the toggle action of the linkage interconnecting the motor 40 in the chuck. In addition, the workholding chuck in the spindle 20, as hereinbefore mentioned, is preferably of the self-locking type when it is in its closed position. Such chucks are conventional and well known to those skilled in the art. It can, therefore, be seen that a substantial force must be supplied to the movable chuck-actuating member 35 to actuate the chuck to an open position.

Summarizing the operation of the bar-feeding mechanism and hydraulic chuck, as thus far described, the operating handle 100 of the main control valve 78 is first moved to its chuck-open position, in which it is held by the ball detent 110, to supply pressure fluid to the motor 40 to actuate the chuck to its open position. The bar stock is then inserted through the guide tube 21, the bar-gripping member 24, the spindle 20 and the workholding chuck C to a position where it partially projects from the forward end of the spindle 20. The gripping elements 31 in the bar-gripping member 24 are then threaded inwardly to tightly grip the bar stock in the bar-gripping member 24. It is assumed that the bar-gripping member 24 is in its most rearward position. Assuming that a bar stock stop is in position forwardly of the spindle, the operating handle 100 of the main control valve 78 is moved to its bar feed position which causes the piston to move from the left-hand end of the cylinder member of the motor 80 toward the opposite end thereof to advance the bar-gripping member until the bar stock strikes the bar stock stop, the position of the stop determining the length of the stock to be machined. It has been assumed that the pawl 51 is in the position shown in Fig. 3 for transmitting feed motion from the fluid pressure motor to the bar-gripping member 27. When the bar stock has been fed outwardly against the bar stock stop, the operating handle 100 of the main control valve 100 is released and is returned to neutral by the action of the biasing springs 119. When the operating handle 100 returns to its neutral position, the conduit 137 to the feed motor 40 is connected to the discharge of the pump 125 through the main valve 78, and the conduit 158 to the feed motor is connected to drain thereby applying a fluid pressure to the right-hand side of the piston 59 of the feed motor 40 to move the piston to the left-hand end of the cylinder chamber of the motor, and thereby restoring the rack 41 to its former position. The pawl 51 now permits the return movement of the rack 41 without transmitting movement to the bar-gripping member 24.

To close the workholding chuck to grip the bar stock during the machining operation, the operating handle 100 is moved to its chuck-close position to supply fluid pressure to the left-hand side of the piston 83 and to connect the right-hand side of the piston to drain. The supply of pressure fluid to the right-hand side of the piston causes the piston to move to the right, as shown in the drawings, to move the chuck-actuating member 93 to its chuck-close position causing it to securely grip the bar stock. After the closing of the work-holding chuck, the operating handle 100 is released and is returned to neutral by the biasing springs 119. It will be remembered that when the operating handle 100 is in its neutral position, both sides of the piston 83 of the chuck-operating motor 80 are connected to drain through the main control valve 78, and that the toggle mechanism retains the workholding chuck in its closed position, and the chuck being of the self-locking type.

After the machining operation is completed on the portion of the bar extending forwardly of the spindle 20, and the machined workpiece is severed from the bar stock, the operating handle 100 is again operated to open the workholding chuck, feed the bar stock outwardly of the spindle against the stock stop and to again close the workholding chuck to securely grip the bar stock therein for the next machining operation. This cycle of operation may be repeated until the bar-gripping member 24 has moved by successive feed movements to its forwardmost position adjacent to the end of the spindle 20. When the bar-gripping member reaches this position, it has to be moved rearwardly before additional stock may be fed outwardly of the spindle.

After the bar-gripping member 24 has reached its forwardmost position, the two upper gripping elements of the bar-gripping member 24 are threaded outwardly to release the grip of the bar-gripping member on the bar stock and the bar-gripping member 24, and the tube 21 connected therewith, are moved rearwardly to their rearwardmost position on the guide rods 25, 26 where the member 24 may again be moved forwardly in a stepwise manner to feed bar stock to the spindle after the tightening of the gripping elements 31. During the rearward movement of the bar-gripping member 24, the workholding chuck in the spindle 20 is maintained in a closed position to prevent shifting of the bar.

The bar-gripping member 24, in the case of smaller bar stock, may possibly be moved rearwardly by the operator himself. However, in the case of larger and heavier bar stocks, frictional forces involved make it extremely difficult, if not impossible, for the operator himself to move the bar-gripping member rearwardly with respect to the bar stock, and the preferred embodiment of the present machine provides power operated means for returning the bar-gripping member to its rearwardmost starting position, or to the position permitted by the length of the bar stock extending rearwardly of the spindle.

In the illustrated and preferred embodiment, to return the bar-gripping member by power, the pawl 51 is moved to the position shown in Fig. 4 so that only motion of the rack 41 in a rearward direction will be transmitted to the bar-gripping member 24. To reciprocate the rack to return the bar-gripping member 24, the operator shifts the slidable valve member 164 of the reversing valve 161. This is done by operating a handle 183 which is connected to a member 184 connected to the valve housing 56 by a pivot screw 185, see Figs. 8 and 16. The member 184 is connected to the slidable valve member 164 by a shoe fitting in a transverse groove 186 in the valve member and pivoted to the member 184. When the feed motor 40 is to be operated to return the bar-gripping member, the handle 183 of the reversing valve 161 is operated to move the movable valve member 164 between the position shown in Fig. 16 and a position wherein the conduit 158 is connected to the right-hand side of the piston 59 of the motor 40, and the conduit 137 is connected to the left-hand side of the piston 59 through the reversing valve 161. Since the conduit 137 is connected through the main control valve 78 to the discharge of the pump 125 and the conduit 158 is connected to drain when the handle of the main control valve is in its neutral position, the piston 59, when the slidable valve is moved to its reversing position, will move to the right from its position adjacent the left-hand end of the cylinder chamber in cylinder member 56. When the slidable valve member 164 is moved to the right, as above described, to cause the piston 59 to move to the right, the land 165 of slidable valve member 164 is moved to the right to a position where the port 173 is blocked from the port 169 and connected to the port 168. It will be remembered that the port 168 is in communication through the groove 178 with the ports 170, 171, and that the conduit 158 is connected to the port 173. The ports 170, 171 are, therefore, now connected to drain through the conduit 158 which is connected to drain through the main control valve 78.

The land 166 of the slidable valve member 164 is moved, when the valve member 164 is shifted to the right, to a position where the lower port 174 is blocked from the upper port 170 and is connected to the upper port 169 to supply pressure fluid through the groove 177 to the port 75 and to the left-hand side of piston 59. The right-hand side of piston 59 is connected to drain, at this time, through the port 76 which communicates with the groove 179 which is, in turn, connected to drain through the upper port 170, the axial bore 163 and the upper port 171 which is connected to the conduit 158 through the groove 178, the upper port 168 and the lower port 173. It will be noted that the land 167, normally blocking the port 171 from the port 170, is moved to the right with the slidable valve member 164 to a position to the right of the port 172 to place the ports 171, 170 in communication through the bore 163. When the slidable valve member 164 is moved to the left to again return it to the position shown in Fig. 16, the conduit 137 is again connected to the right-hand side of the piston 59 through the valve 161, and the conduit 158 is connected to the left-hand side of the piston 59 through the valve 161 to cause the piston 59 to move to the left-hand end of the cylinder chamber in the cylinder member 56. It can now be seen that by reciprocating the valve member 164 between its positions, the fluid pressure supply and the drain connections to the cylinder housing 56 may be successively reversed to cause reciprocation of the piston 59 and, in turn, the rack 41 to return the bar-gripping member to its rearwardmost position. When the bar gripping member 24 is returned, the clamp screws 31 are tightened to again condition the bar-gripping member for the next feeding operation, and the pawl 51 is again thrown to the position shown in Fig. 3 so that the forward movement of the rack 41 will be transmitted to the bar-gripping member 24 upon operation of the fluid motor 40 under the control of the main control valve.

To again feed the bar stock forwardly, the operating handle 100 of the main control valve is moved to its chuck-open position and then to its bar feed position in the manner described above.

From the foregoing description it can be seen that the bar-gripping member 24 is advanced in successive steps to impart successive feed movements to the bar stock to be operated upon. Preferably the stroke of the feed motor 40 is greater than the distance which the bar-gripping member is to be moved each time the bar stock is fed forwardly. However, if the stroke is less than the length of bar stock to be fed outwardly of the spindle, the proper amount may be fed by manipulating the operating handle 100 to cause the feed motor 40 to reciprocate two or more times in order to advance the bar-gripping member the required distance. It will be noted that the bar-gripping member does not reciprocate with respect to the bar stock each time the bar stock is advanced, thereby making it possible to feed the maximum length of bar stock to the spindle and to eliminate wear normally caused by the stripping of the bar-gripping member in a rearward direction with respect to the bar stock each time the bar stock is advanced.

It also can be seen from the foregoing that the objects heretofore enumerated and others have been accomplished and that the present invention provides a new and improved machine tool for machining bar stock which has a fluid pressure motor for operating a workholding chuck in the spindle for gripping the bar stock, and a reciprocatory motor, preferably a fluid pressure motor, for advancing the bar stock through the spindle after an article has been machined and severed from the portion of the bar stock extending forwardly of the spindle. The motors for feeding the bar stock and operating the workholding chuck are under the control of a main control valve moved by the main control lever which is operative to open and close the workholding chuck independently of the operation of the bar-feeding mechanism and is movable to a position where the workholding chuck is open and the bar-feeding mechanism is operated to feed the bar stock outwardly of the spindle. In the preferred embodiment, the motor for feeding the bar stock is operatively connected to a member for gripping the bar stock through a ratchet mechanism which permits the stroke of the motor to be less than the range of movement of the bar-gripping member, the ratchet mechanism preferably being reversible to permit the motor to be used to move the bar-gripping member in a direction away from the spindle into a position to again begin its feeding movement. The main control valve for controlling the operation of the motors for operating the workholding chuck and the bar feed mechanism is preferably so constructed and arranged that pressure fluid is supplied to a connection between the main control valve and the feed motor and a connection from the feed motor to the main control valve is connected to drain, and a reversing valve is provided in the connections between the main control valve and the feed motor to enable the connections between the main control valve and the feed motor to be selectively connected to different sides of the piston 59 thereby enabling the feed motor to be reciprocated by operation of the reversing valve.

While the preferred embodiment of the present invention has been described in considerable detail, further modifications, constructions and arrangements will appear to those skilled in the art and it is hereby my intention to cover all possible modifications, combinations and arrangements which fall within the scope and spirit of the appended claims.

Having thus described my invention, I claim:

1. In a machine tool of the character described having a workholding chuck for holding bar stock to be operated upon and a movable bar-feeding member adapted to engage the bar stock and movable in a feed direction to feed the bar stock through the workholding chuck, a first double-acting fluid pressure motor operatively connected to said workholding chuck for actuating the latter between its open and work-engaging positions upon operation in first and second directions respectively, a second double-acting fluid pressure motor having a movable reciprocatory element movable in two opposite directions, means operatively connecting said second fluid pressure motor to said bar-feeding member to bodily move the latter in said feed direction when the movable element of said second fluid pressure motor moves in one of its directions, valve means for controlling the supply of pressure fluid to said motors including a movable valve member having a first position in which fluid pressure is supplied to said second motor to urge the movable element thereof in said one direction and a second position for supplying fluid pressure to said second double-acting fluid pressure motor to move said movable element in the other of its said directions; the improvement comprising conduit means connecting said valve means to said motors for supplying fluid pressure from said valve means to each of said motors independently of the operation of the other of said motors, said valve member having third and fourth positions for supplying pressure fluid to the connections for said first motor to operate said first motor in first and second directions respectively, said third position of said valve member being intermediate said first position and said second position and said fourth position being on a side of said second position remote from said first and third positions, and means for yieldably urging said valve member to said second position.

2. In a machine tool of the character described having a workholding chuck for holding bar stock to be operated upon and a movable bar-feeding member adapted to engage the bar stock and movable in a feed direction to feed the bar stock through the workholding chuck, a first double-acting fluid pressure motor having pressure chambers and being operatively connected to said workholding chuck for actuating the latter between its open and work-engaging positions when operated in first and second directions respectively, a second double-acting fluid pressure motor having a reciprocatory element, means operatively connecting said second fluid pressure motor to said bar-feeding member to bodily move the latter in said feed direction when the reciprocatory element of said second fluid pressure motor moves in one direction and to permit relative movement between said bar-feeding member and said reciprocatory element when the latter moves in a direction opposite to said one direction, the extent of movement of said bar-feeding member in said feed direction being greater than the extent of movement of said reciprocatory element in said feed direction, and valve means for controlling the supply of pressure fluid to said motors comprising a valve member having a first position for supplying fluid pressure to said second fluid pressure motor to move said reciprocatory element in said one direction and a second position in which fluid pressure is supplied to said second motor to urge the reciprocatory element thereof in its second mentioned direction; the improvement which comprises conduits connecting said valve means and said first double-acting fluid pressure motor independently of said second double-acting fluid pressure motor, said valve member connecting the chambers of said first motor to drain when in its said first position and the valve member further having a third position for supplying pressure fluid to said first motor to operate the latter in its said first direction and a fourth position for supplying pressure fluid to said first motor to operate said first double-acting fluid pressure motor in its said second direction; said third position of said valve member being intermediate said first position and said third position and said fourth positon being on a side of said second position remote from said first and third positions, and means for yieldably urging said control lever to said second position.

3. An apparatus as defined in claim 2 wherein said means operatively connecting said second double-acting fluid pressure motor to said bar-feeding member comprises a rack operatively connected to said reciprocatory element of said second motor for reciprocation thereby and a reversible ratchet pawl carried by said bar-feeding member for cooperating with said rack to transmit the motion of the rack in one direction to said bar-feeding member.

4. In a machine tool of the character described having a workholding chuck and a movable bar-gripping member for engaging bar stock and moving the latter through the workholding chuck, a first double-acting fluid pressure motor operatively connected to said workholding chuck for operating the latter between its open and closed positions when operated in first and second directions respectively, power actuated means for moving said bar gripping member comprising a second double-acting fluid pressure motor having a movable element reciprocable in first and second opposite directions upon operation of the second motor, motion-transmitting means operatively connecting said movable element to said bar-gripping member to bodily move the bar-gripping member in a feed direction to feed bar stock through said workholding chuck when said movable element is reciprocated in its first direction and to permit relative movement between the movable element and said bar-gripping member when the movable element is moved in its second direction, fluid connections to each of said motors for supplying pressure fluid thereto and exhausting fluid therefrom; the improvement which comprises a control valve connected to said fluid connections for controlling the flow of pressure fluid to and the exhaust from each of said motors independently of the operation of the other motor and having positions for operating said first motor in its first and second directions respectively and for reciprocating said second motor to move said movable element in said first and second directions respectively, said motion-transmitting means including means for reversing the direction of motion transmitted from said movable element to said bar-gripping member and said fluid connections to said second motor including a valve operable to reciprocate said second fluid pressure motor when said control valve is in a position connecting the fluid connections to said second motor to a source of pressure fluid and exhaust respectively, and spring means for urging said control valve to a position wherein the fluid connections of said second motor are connected respectively to said source of fluid pressure and exhaust.

5. An apparatus as defined in claim 4 wherein said motion-transmitting means comprises a rack reciprocated by said movable element and a two-way positioned pawl carried by said bar-gripping member selectively engageable with said rack to selectively transmit the motion of said rack in either one of its directions to said bar-gripping member.

6. In a machine tool of the character described having a workholding chuck and a movable bar-gripping member for engaging bar stock and moving the latter through the workholding chuck, a first double-acting fluid pressure motor operatively connected to said workholding chuck for operating the latter between its open and closed positions upon operation of the motor in first and second directions respectively, power actuated means for moving said bar-gripping member comprising a second double-acting fluid pressure motor having a movable element reciprocable in first and second opposite directions upon operation of the second motor, motion-transmitting means operatively connecting said movable element to said bar-gripping member to bodily move the bar-gripping member in a feed direction to feed bar stock through said workholding chuck when said movable element is reciprocated in its first direction and to permit relative movement between the movable element and said bar-gripping member when the movable element is moved in its second direction, fluid connections to each of said motors for supplying pressure fluid thereto and exhausting fluid therefrom; the improvement which comprises a control valve connected to said fluid connections for controlling the flow of pressure fluid to and the exhaust from each of said motors independently of the other of said motors and having a first position in which the fluid connections to said second motor are connected to supply and exhaust so that said movable element is urged in its first direction, a second position for connecting the fluid connections to said first fluid pressure motor to drain and for supplying pressure fluid to the connections to said second fluid pressure motor to apply fluid pressure to said second motor to move the movable element in its second direction, a third position for connecting the fluid connections to said second motor to drain and for connecting the fluid connections to said first motor to exhaust and the fluid pressure supply so as to operate said first motor in its said first direction, and a fourth position for supplying fluid pressure to said first motor for operating it in its said second direction and for connecting the fluid connections to said second motor to drain, said motion-transmitting means including means for reversing the direction of motion transmitted from said movable element to said bar-gripping member and said fluid connections to said second motor including a valve operable to reciprocate said second motor when said control valve is in said second position, and spring means for urging said control valve to said second position.

7. In a machine tool for performing an operation upon bar stock having a movable bar-gripping member for engaging the bar stock and moving the latter in a feed direction, a fluid pressure motor, motion-transmitting means connecting the reciprocable element of said motor to said bar-gripping member to move the latter in a feed direction upon operation of the motor in one direction and to permit operation of said motor in the opposite direction without transmitting motion to said bar-gripping member, first and second conduits, and valve means having a first position for connecting said first and second conduits to opposite fluid pressure sides of said motor and a second position reversing the connections of said conduits to said motor, valve means for controlling the connections of said fluid conduits to a source of pressure fluid and to exhaust, said second valve means having a first position in which said first conduit is connected to exhaust and said second conduit to the source of pressure fluid and a second position in which said second conduit is connected to exhaust and said first conduit to the source of pressure fluid, said motion-transmitting means including means for reversing the direction of motion transmitted from said motor.

8. In a machine tool having a movable bar-gripping member for engaging the bar stock and moving the latter in a feed direction, a double-acting fluid pressure motor, motion-transmitting means connecting said motor to said bar-gripping member to move the latter in a feed direction upon operation of the motor in one direction and to permit operation of said motor in the opposite direction without transmitting motion to said bar-gripping member, first and second conduits, and valve means having a first position for connecting said first conduit to said motor on one fluid pressure side thereof and said second conduit to said motor on the opposite fluid pressure side thereof and a second position reversing the connections of said conduits to said motor; the improvement which comprises second valve means for controlling the connections of said fluid conduits to a source of pressure fluid and to exhaust, said second valve means having a first position in which said first conduit is connected to exhaust and said second conduit to the source of pressure fluid and a second position in which said second conduit is connected to exhaust and said first conduit to the source of pressure fluid, said motion-transmitting means including an axially movable rack connected to said motor for reciprocation thereby and a pawl carried by said bar-gripping member and having a first position in engagement with said rack for transmitting motion of said reciprocable element in one direction to said bar-gripping member and a second position for transmitting motion of said reciprocable element in the opposite direction to said bar-gripping member.

9. In a machine tool having a workholding chuck for clamping bar stock, a first fluid pressure motor for actuating said chuck between an open and a closed position upon operation of the motor in first and second directions respectively, a movable bar-gripping member for engaging bar stock and moving the latter in a direction to feed the bar stock through said workholding chuck, a second double-acting fluid pressure motor, motion-transmitting means connecting said second fluid pressure motor to said bar-gripping member to move the latter in a feed direction upon operation of the second motor in one direction and to permit operation of said second motor in the reverse direction without transmitting motion to said bar-gripping member, first and second fluid conduits, and first valve means having a first position connecting said conduits to opposite sides of said second double-acting fluid pressure motor and a second position reversing the connections of said conduits to said second motor; the improvement which comprises second valve means for controlling the operation of said motors and connected to said first and second conduits, fluid connections interconnecting said second valve means and said first fluid pressure motor independently of said second motor, said second valve means having at least a first position in which said first and second fluid conduits are connected respectively to a source of pressure fluid and to exhaust and a second position in which said first and second fluid conduits are respectively connected to exhaust and the source of pressure fluid, said motion-transmitting means including means for reversing the direction of motion transmitted from said second double-acting fluid pressure motor to said bar-gripping member.

10. The apparatus as defined in claim 9 wherein said motion-transmitting means comprises an axially movable rack operatively connected to said second double-acting fluid pressure motor for reciprocation thereby and a two-way ratchet pawl carried by said bar-gripping member and having a first position in engagement with said rack for transmitting motion of said rack in one direction and a second position in engagement with said rack for transmitting motion of said rack in its other direction.

11. In a machine tool having a workholding chuck for clamping bar stock, a first double-acting fluid pressure motor operatively connected to said workholding chuck for actuating said chuck between an open and a closed position upon operation of the motor in first and second directions respectively, a movable bar-gripping member for engaging bar stock and moving the latter in a feed direction to feed the bar stock through said workholding chuck, a second fluid pressure motor comprising piston and cylinder elements, one of said elements being reciprocable in first and second opposite directions relative to the other of said elements upon introduction of fluid pressure on first and second sides respectively of said piston element, motion-transmitting means connecting the reciprocable element of said second fluid pressure motor to said bar-gripping member to move the latter in a feed direction upon movement of the reciprocable element in said first direction and to permit movement of said reciprocable element in said second direction without transmitting motion to said bar-gripping member, first and second fluid conduits, first valve means having a first position connecting said first conduit to said cylinder element on said first side of said piston element and said second conduit on said second side of said piston element and a second position reversing the connections of said conduits to said cylinder element with respect to said piston element; the improvement comprising second valve means for controlling the operation of said motors and connected to said first and second conduits, fluid connections interconnecting said second valve means and said first fluid pressure motor, said second valve means having a first position in which said first and second fluid conduits are respectively connected to exhaust and a source of fluid pressure supply so as to urge said reciprocable element in said second direction when said first valve means is in its first position and in which the connections to said first fluid pressure motor are connected to exhaust and a second position in which said first and second fluid conduits are respectively connected to the source of fluid pressure and exhaust so as to urge said reciprocable element in said first direction when said first valve means is in its said first position and in which the connections to said first fluid pressure motor are connected to exhaust and a third position intermediate said first and second positions of said second valve means in which said fluid conduits are connected to exhaust and said fluid connections are connected to the source of pressure fluid and exhaust so as to actuate said first motor in its said first direction, said motion-transmitting means including means for reversing the direction of motion transmitted from the said reciprocable element of said second fluid pressure motor to said bar-gripping member, and a toggle linkage operatively connecting said first motor to said workholding chuck and operable through dead center on reciprocation of the first motor to actuate the chuck between open and closed positions.

12. A machine tool having a workholding chuck for clamping bar stock, a first double-acting fluid pressure motor for actuating said chuck between an open and a closed position, a movable bar-gripping member for engaging bar stock and moving the latter in a direction to feed the bar stock through said workholding chuck, a second double-acting fluid pressure motor operable in first and second opposite directions, motion transmitting means operatively connecting said second fluid pressure motor to said bar-gripping member to move the latter in a feed direction upon operation of said second motor in one direction and to permit operation of said second motor in a reverse direction without transmitting motion to said bar-gripping member, first and second fluid conduits, and first valve means having a first position connecting said conduits to opposite sides of said second motor and a second position reversing the connections of said conduits to said second motor; the improvement comprising second valve means for controlling the operation of said second motor and connected to said first and second conduits, fluid connections interconnecting said second valve means and said first fluid pressure motor independently of said second motor, said second valve means having first position in which respective ones of said first and second fluid conduits are connected to exhaust and a source of fluid pressure supply respectively and a second position in which the connection of said first and second fluid conduits to the source of fluid pressure and exhaust are reversed and a third position intermediate said first and second positions in which said fluid conduits are connected to exhaust and said fluid connections are connected to the source of pressure fluid and exhaust so as to actuate said first motor in its said first direction, said motion transmitting means including means for reversing the direction of motion transmitted from said second double-acting fluid pressure motor to said bar-gripping member.

13. In a machine tool, the combination as defined in claim 12 wherein said second valve means has a fourth position on the side of its said first position remote from its said second and third positions, said second valve means when in said fourth position connecting said conduits to exhaust and said fluid connections to exhaust and the source of pressure fluid to operate said first motor in its said second direction.

14. The apparatus as defined in claim 12 wherein said motion-transmitting means comprises an axially movable rack operatively connected to said second double-acting fluid pressure motor for reciprocation thereby and a two-way ratchet pawl carried by said bar-gripping member and having a first position in engagement with said rack for transmitting motion of said rack in one direction and a second position in engagement with said rack for transmitting motion of said rack in its other direction.

15. A control system for effecting the operation of a feed motor for advancing bar stock and of a chuck motor for opening and closing a workholding chuck for clamping the stock, the chuck motor being reciprocated in a first direction to open the chuck and in a second direction to clamp the stock, a control valve for said motors, first and second pairs of fluid conduits, the respective conduits of each pair being connected to the opposite fluid pressure sides of a respective one of said motors and to said control valve, the pair of conduits for each motor being connected to said control valve independently of the other motor, said control valve having a first position in which the respective ones of said pair of conduits for said feed motor are connected to a source of pressure fluid and exhaust respectively and a second position wherein the connection of said conduits for said feed motor to the source of pressure fluid and exhaust is reversed, said control valve further having a third position connecting the respective ones of the other pair of fluid conduits to the source of pressure fluid and exhaust respectively so as to urge said chuck motor to operate in its said first direction, and a fourth position wherein the connection of said other pair of conduits to exhaust and the source of pressure fluid are reversed, said third position of said valve being intermediate its first and second positions and said fourth position being disposed on the side of the said first position remote from said second and third positions.

16. In a control system as defined in claim 15 wherein the pair of conduits connected to said feed motor includes a valve reciprocable to reverse the connection of the pair of fluid conduits to said feed motor.

17. In a system for controlling the reciprocation of a double-acting feed motor to drive a member, first and second fluid conduits connected to the opposite sides of said motor, a first valve for controlling the connection of said first and second fluid conduits to said motor and having a first position connecting said first fluid conduit to one side of said motor and the second fluid conduit to the other side and a second position interchanging the connection of said fluid conduits to said motor, a second valve having a first position connecting said first conduit to a source of pressure fluid and said second fluid conduit to exhaust, and a second position interchanging the connection of said first and second connections to the source of pressure fluid and exhaust.

18. In a system as defined in claim 17 wherein said motor is operatively connected to drive said member by a reversible, one-way, ratchet type connection.

19. In a system having a first double-acting fluid pressure motor actuatable between first and second positions by applying fluid pressure to opposite sides of the motor alternately, a second fluid pressure motor actuatable between first and second positions by applying fluid pressure to opposite sides of the motor alternately, valve means for controlling the supply of pressure fluid to said motors including a movable valve member having first and second positions in which pressure fluid is supplied to said second motor to operate the latter to its said first and second positions respectively, said valve member further having third and fourth positions for supplying pressure fluid to said first motor to operate said first motor to its said first and second positions respectively, said third position of said valve member being intermediate its said first and second positions whereby said valve moves through said third position when moving between its said first and second positions and said fourth position of the valve member being on a side of the first position thereof remote from its said second and third positions, means for yieldably urging said valve member to its said first position, and conduit means connecting said valve means to said motors to supply pressure fluid to each of said motors independently of the operation of the other of said motors.

20. In a system, the structure as defined in claim 19 wherein said valve when in its said first position connects both sides of said first motor to drain.

21. In a system of the character described, a first double-acting fluid pressure motor actuatable between first and second positions by applying fluid pressure to opposite sides of the motor alternately, a second double-acting fluid pressure motor actuatable between first and second positions by applying fluid pressure to opposite sides of the motor alternately, valve means, a reversing valve, first and second conduits connecting said reversing valve and said valve means, further fluid pressure connections connecting said reversing valve to said second fluid pressure motor, said reversing valve having a first position wherein said first conduit is connected to one side of the motor and said second conduit to said other side of the motor and a second position wherein the connections are interchanged, third and fourth conduits connecting said valve means to opposite sides of said first motor, said valve means having a first position wherein said first and second conduits are connected to drain and a source of fluid pressure respectively and a second position wherein the connections are reversed, said valve means further having a third position intermediate said first and second positions wherein said third and fourth conduits are connected to a source of pressure and drain to effect operation of said motor to one of its positions and a fourth position on the side of said first position remote from said second and third positions wherein said third and fourth conduits are connected to a source of fluid pressure and drain to operate the motor to its other position whereby said valve means may be operated between its said first and second positions to reciprocate said second motor while said first motor remains in its position corresponding to the said third position of the valve.

22. In a system of the character described, the structure as defined in claim 21 wherein a member is reciprocated by said second fluid pressure motor and said second fluid pressure motor is connected to said member through a reversible ratchet type connection.

References Cited in the file of this patent
UNITED STATES PATENTS

| | | |
|---|---|---|
| 1,117,150 | Ammon | Nov. 17, 1914 |
| 1,928,048 | Currens | Sept. 26, 1933 |
| 2,308,348 | Ballash | Jan. 12, 1943 |
| 2,639,736 | Tomlinson | May 26, 1953 |
| 2,695,096 | Gridley | Nov. 23, 1954 |
| 2,765,627 | Chambers | Oct. 9, 1956 |
| 2,791,885 | Sassen | May 14, 1957 |